US006817393B2

(12) United States Patent
Quenneville

(10) Patent No.: US 6,817,393 B2
(45) Date of Patent: Nov. 16, 2004

(54) END-DOGGING HEAD SAW AND METHOD

(76) Inventor: Gerald M. Quenneville, 16 Buttnernut, Aylmer, Quebec (CA), J9H 3Z7

( * ) Notice: Subject to any disclaimer, the term of this patent is extended or adjusted under 35 U.S.C. 154(b) by 0 days.

(21) Appl. No.: 10/193,208

(22) Filed: Jul. 12, 2002

(65) Prior Publication Data

US 2003/0015256 A1 Jan. 23, 2003

(30) Foreign Application Priority Data

Jul. 17, 2001 (CA) ............................................ 2353139

(51) Int. Cl.[7] .......................... B23Q 15/24; B23Q 15/26

(52) U.S. Cl. ........................ 144/357; 144/3.1; 144/374; 144/378; 83/367

(58) Field of Search ................................ 144/357, 376, 144/378, 394, 215.2, 2.1, 3.1, 356, 374, 162.1, 242.1; 83/23, 75, 75.5, 76.8, 367, 804, 808

(56) References Cited

U.S. PATENT DOCUMENTS

| | | | | |
|---|---|---|---|---|
| 3,190,323 A | | 6/1965 | Johansson | |
| 3,459,246 A | | 8/1969 | Ottosson | |
| 4,069,851 A | | 1/1978 | Bibler | |
| 4,117,755 A | * | 10/1978 | Hasenwinkle et al. | 83/435.24 |
| 4,294,149 A | | 10/1981 | Olsson | |
| 4,996,900 A | * | 3/1991 | Schmidt et al. | 83/400 |
| 5,035,166 A | * | 7/1991 | Carlson et al. | 83/801 |
| 5,176,055 A | | 1/1993 | Wijesinghe | |
| 5,421,385 A | * | 6/1995 | McGee | 144/357 |
| 5,503,046 A | | 4/1996 | Emter | |
| 5,503,202 A | | 4/1996 | Butler | |

FOREIGN PATENT DOCUMENTS

| | | |
|---|---|---|
| CA | 1 108 968 | 9/1981 |

* cited by examiner

*Primary Examiner*—Allen Ostrager
*Assistant Examiner*—Shelley Self
(74) *Attorney, Agent, or Firm*—Shapiro Cohen

(57) ABSTRACT

An end-dogging head saw is disclosed comprising a log cradle for supporting a log, a log-turning device for rotating the log into proper alignment with a pair of band saws, the log-turning device depending from overhead log carriages which move the log into contact with the band saws, and a carriage drive for powering the overhead log carriages, whereby short logs can be quickly and efficiently processed. The invention also seeks to provide a method for using the apparatus, comprising rotation of a log through 360 degrees to allow for cutting at any desired angle along the length of the log. The method allows for maximal recovery of high-quality lumber.

25 Claims, 9 Drawing Sheets

END-DOGGING HEAD SAW AND METHOD

FIELD OF INVENTION

This invention relates to sawmills, and particularly to sawmills adapted to recover lumber products from short logs.

Standard sawmills are often unable to recover good quality lumber from short logs, i.e. 8 feet and under, resulting in waste of potential lumber material as wood chips. While some innovative sawmills have attempted to address this need, the present invention provides a novel means of recovering a maximal amount of high-quality lumber from logs under 8 feet.

The development of the present invention was necessitated by the limitations of the standard sawmills in the industry in addressing short log lumber recovery. In particular, some means are required for recovering lumber products with a minimal amount of waste chip production.

In response to this problem, the present invention seeks to provide an apparatus and process for maximizing high-quality lumber recovery while limiting the amount of waste wood chips. In order to accomplish this, the present invention comprises a novel positioning and cutting apparatus which, when employed in the manner set out below, will allow lumber processing companies to maximize yield from short logs of previously little recoverable value. A log is positioned in a log cradle, stabilized by means of end dogs, and passed through band saw cutting means by means of overhead log carriages, but the log can be returned to its initial pre-cutting location any number of times and rotated through a full 360 degrees by a log-turning device to any desired position before again passing the log through the cutting means. Scanning means are employed to determine log diameter to enable cradle adjustment and initial log positioning.

While the standard sawmills usually cannot economically recover lumber from logs less than 8 feet in length, the present invention can quickly and efficiently process such logs into boards ranging from 2 inches×½ inch×1 foot to 10 inches×10 inches×8 feet. In addition, the present invention is compact in size and can be used either in concert with existing sawmills or as a stand-alone unit for small-log operations. Also, the fully rotatable positioning mechanism allows for tangential cuts at any face rather than the usual four faces possible in standard sawmills, enabling maximal yield. Another feature of this invention is the use of band saws rather than the standard circular saws, which allows for cutting of logs up to 28 inches in diameter.

DESCRIPTION OF THE BACKGROUND ART

Prior attempts to provide small log recovery sawmills include U.S. Pat. No. 4,117,755, wherein is disclosed a log sawing and transport system that positions a log, uses end dogs to secure it, and moves the log through cutting means with axially moveable carriage units. However, this apparatus fails to maximize high-quality lumber recovery, as it employs circular saws to produce sector-shaped pieces. At least one of the saws can be adjusted to different angles, but this is addressed to the specific problem of quarter-sawing rather than recovery of high-quality boards.

Other prior art has addressed related problems. U.S. Pat. No. 3,459,246 discloses a lumber plant that employs band saws adjustable to the diameter of a given log, using scanning means to determine the diameter. Also, logs are gripped at their ends to be transported through paired cutting means. However, this invention fails to consider problems of yield maximization of short logs, as it primarily addresses band saw adjustment.

Canadian Patent No. 1,108,968 discloses a scrag saw mill dogging system that employs dogs on moveable carriages. However, the dogs attach to the log's sides, the carriages are not utilized during the actual cutting phase, and the invention is directed specifically to a problem associated with scrag saw mill operation.

Multiple passes through cutting means (e.g. U.S. Pat. No. 5,503,202) and rotatable dogging means (e.g. U.S. Pat. No. 5,421,385) are known in the art, but they are not directed towards short log lumber recovery maximization as in the present invention.

The present invention offers a novel solution to the problem of efficient and cost-effective small log lumber recovery. The innovative use of an adjustable log cradle, rotating end dogs, movable carriages, adjustable band saws, and other features addresses a serious lumber industry waste issue.

SUMMARY OF THE INVENTION

The principal object of this invention is, therefore, to seek to provide a lumber-processing apparatus and method adapted to the specific problem of short log recovery, the apparatus comprising means for rotating, transporting, and cutting short logs. The method uses the disclosed apparatus to make particular cuts of a short log.

Other objects will appear from the description and the drawings.

Accordingly, the present invention provides an end-dogging head saw comprising a log cradle for supporting a log, a log-turning device for rotating the log into proper alignment with a pair of band saws, the log-turning device depending from overhead log carriages which move the log into contact with the band saws, and a carriage drive for powering the overhead log carriages, whereby short logs can be quickly and efficiently processed. The invention also seeks to provide a method for using the apparatus, comprising rotation of a log through 360 degrees to allow for cutting at any desired angle along the length of the log. The method allows for maximal recovery of high-quality lumber.

BRIEF DESCRIPTION OF THE DRAWINGS

In the drawings, according to a preferred embodiment of the invention.

DETAILED DESCRIPTION OF A PREFERRED EMBODIMENT

Figure 1:
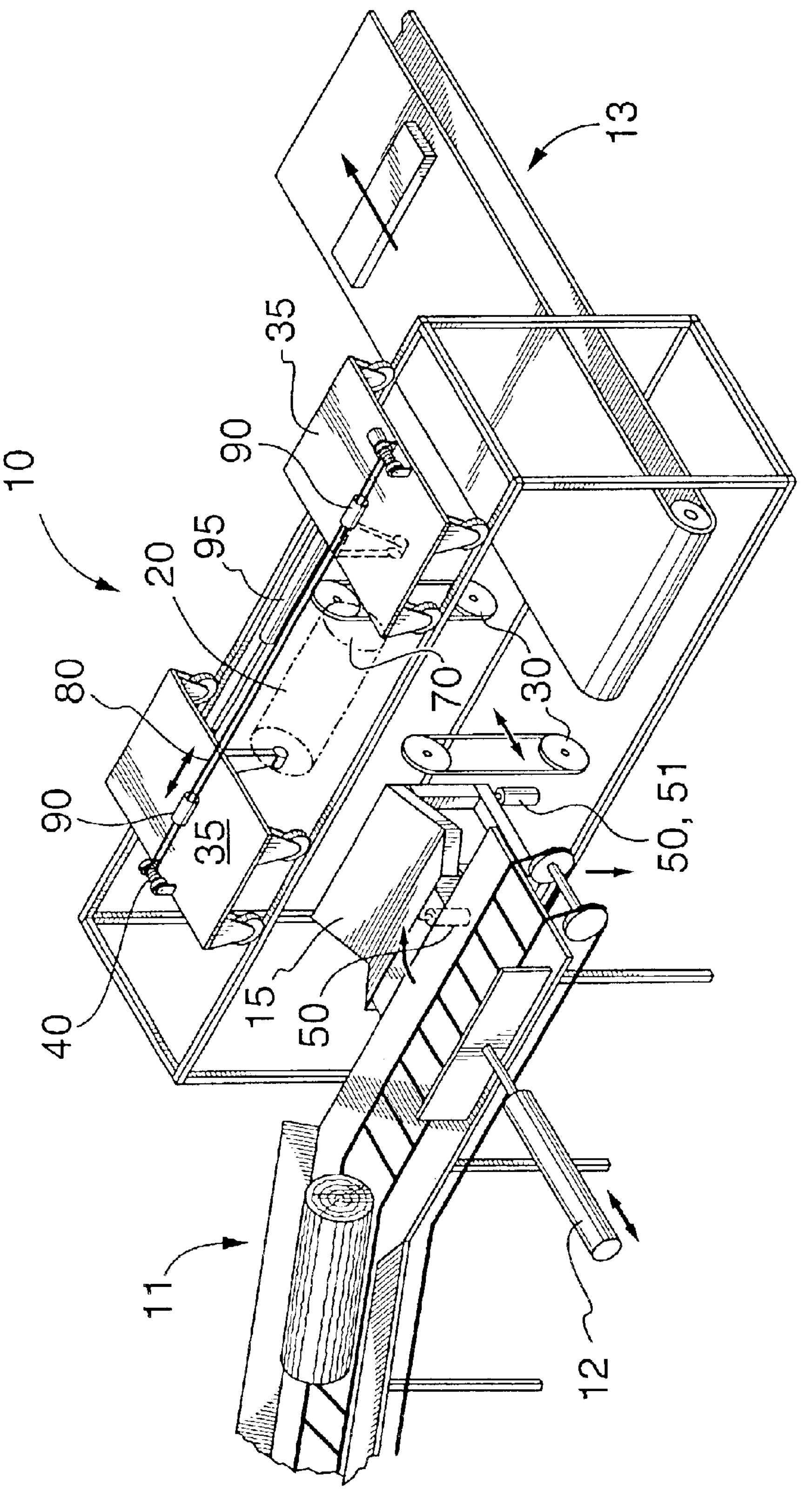
FIG. 1 is a diagrammatic perspective view of the present invention attached to log-feeding and board-removal mechanisms.
Figure 2:
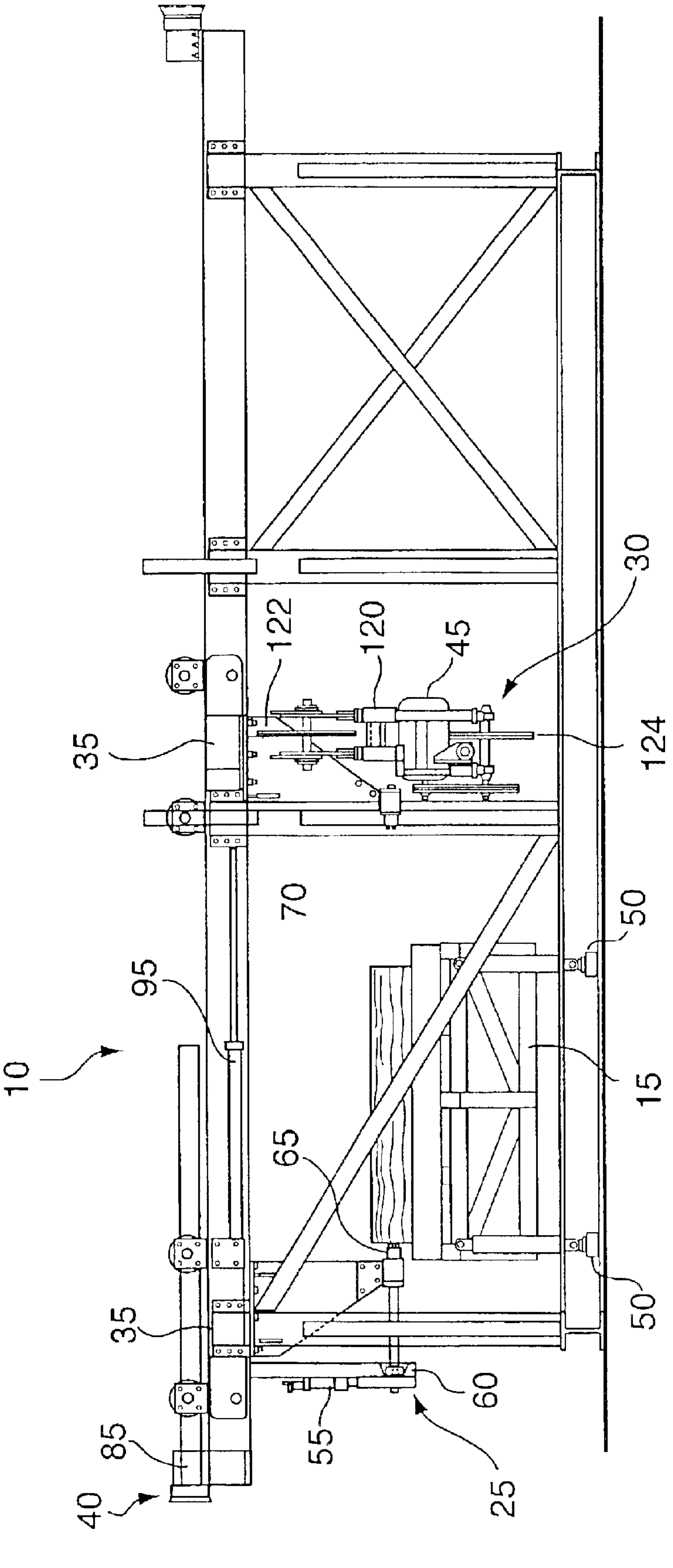
FIG. 2 is a detailed side view of the present invention.
Figure 3:
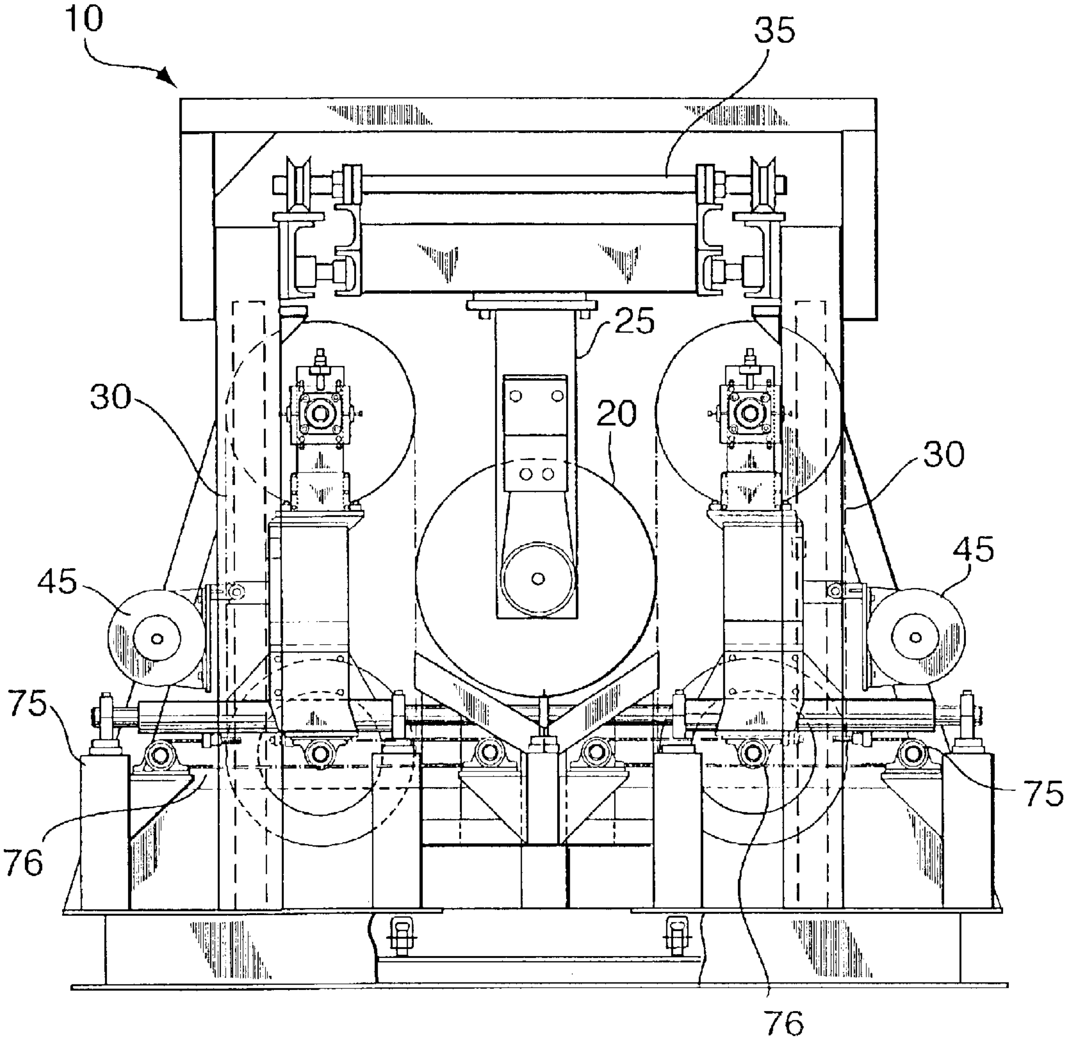
FIG. 3 is a detailed end view of the present invention.

Referring now in detail to the Figures, and particularly FIGS. 1 to 3, an end-dogging head saw is a preferred embodiment of the present invention and is generally denoted as 10. The end-dogging head saw 10 is comprised of a log cradle 15, a log-turning device 25, band saws 30, and overhead log carriages 35 on a frame 34. As illustrated in FIG. 1, the end-dogging head saw 10 is fed with logs 20 by means of a log-feeding mechanism 11, driven by a hydraulic cylinder 12, and the processed lumber passes out of the end-dogging head saw 10 by means of parallel or perpendicular board-removal mechanism 13.

Figure 6:
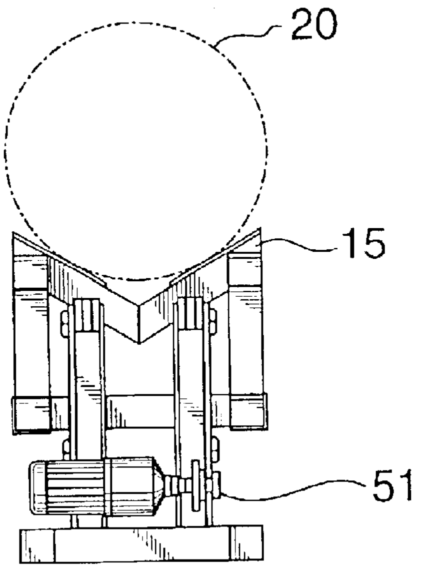
FIGS. 6 and 7 are end views of the log cradle provided with servo motors.
Figure 7:
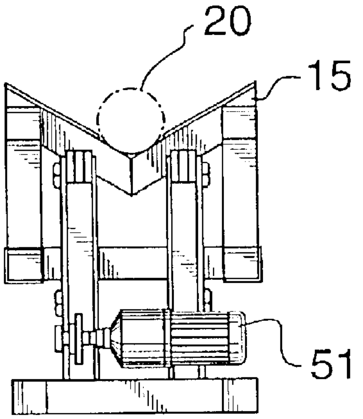
Figure 8:
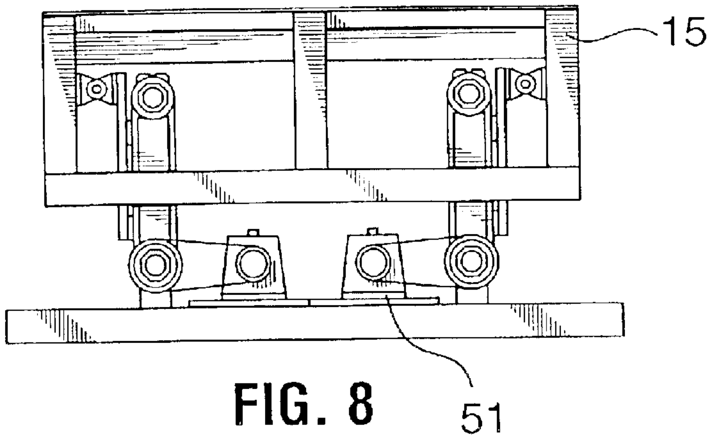
FIG. 8 is a side view of the log cradle provided with servo motors.

The log cradle 15 is adjustable either automatically or manually, and it receives the log 20 for the initial positioning stage (see FIGS. 6, 7, and 8). The log cradle 15 tilts from side to side and is capable of vertical movement, through use of hydraulic cylinders 50 or servo motors 51 and chain 52, allowing the operator to position the log 20 in proper alignment for cutting. A scanner 18 (shown in FIG. 9) detects the diameter at each end of log 20 and this data is sent to PLC input/output port 19 (shown in FIG. 9) for processing by the PLC 17 to enable automatic position adjustment of the log cradle 15, or manual adjustment from an operator console 200 (shown in FIG. 9).

A PLC, or programmable logic control, is a special purpose computer aimed at implementing control systems. The PLC 17 used in the present invention has a series of inputs and outputs to control the functionalities of the end-dogging head saw 10. PLCs are modular in nature such that each function is a separate module. Modules may be readily added to the design in order to customize the system for a particular use. The number of modules implemented in a PLC will vary but each module will have the same basic function of obtaining or delivering controls and information between the measurement level and the operator interface level. The program code is an integral part of the PLC. The program code is usually developed and edited on a programming computer and then stored on the PLC. The program code for the end-dogging head saw 10 was also developed in modules, wherein each module incorporates the various measurements taken, the operator interface, and the control functions required.

Figure 9:
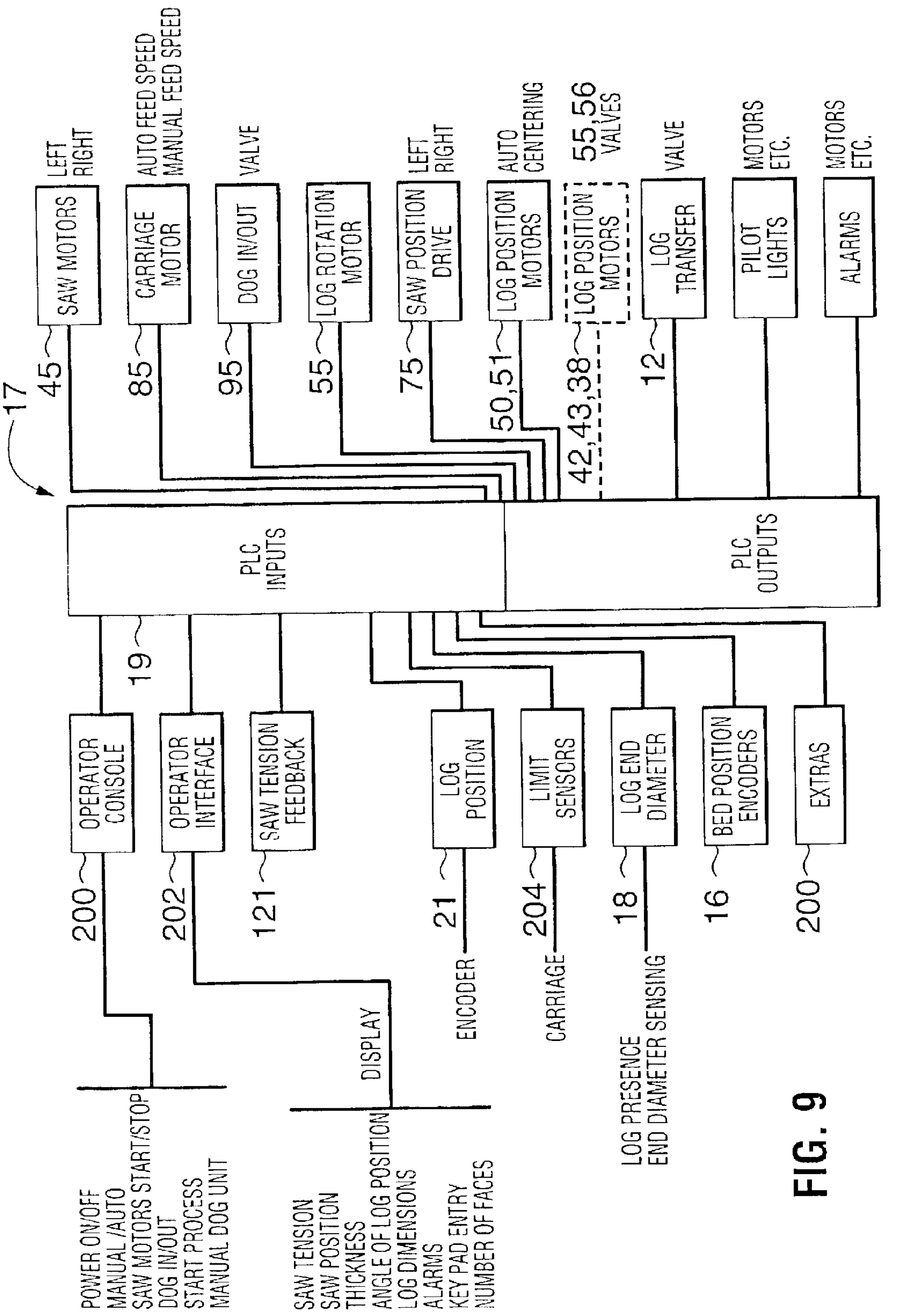
FIG. 9 is a schematic of the electrical system.

FIG. 9 illustrates a schematic block diagram of the PLC input/output ports 19. The inputs are read in along various input ports on the PLC 17. The operator console 200 may have several inputs, such as switches or sensors, to dictate when the end-dogger head saw 10 is to start up. The operator console 200 has an input for powering up the system, starting the saw motors 45, and utilizing the end dogs 65 and 70. The operator may choose either to control the end dogs 65 and 70 manually or allow certain PLC modules to perform those functionalities. The operator interface 202 has various PLC input/output ports 19 to read in saw tension, saw position, thickness selection, angular log position, log dimensions, and alarms. The operator inputs his selections at the operator interface 202 which is then read in by the PLC 17. The saw tension feedback 121 from strain gauge 120 is a measurement taken at the PLC input to ensure that the level of tension is within an acceptable range. The log position is scanned by scanning means 21 and a position value is read in by the PLC 17. The output from the limit sensors 204 is read in by the PLC 17 to measure the position of the overhead log carriages 35 in relation to the position of the log 20. The log end diameter is scanned by scanning means 18 similar to those used for the log position. The PLC 17 requires the log end diameter to calculate the position for the band saws 30. The bed position encoders 16 measure the position of the log cradle 15 as values are read in at the PLC 17 input. Various other inputs may be added for further control of the end-dogging head saw 10. These other inputs are shown in FIG. 9 as extras.

The PLC 17 utilizes all measurements taken at the inputs in various modules of the PLC program. The PLC 17 then outputs various control information to various devices. The PLC 17 will output a signal to the saw motor's positioning system 75 dictating whether the band saw 30 should move in or out. The carriage motor 85 is connected to a PLC output and awaits a signal dictating the feed speed. The carriage motor 85 may also be manually controlled by a set of manual inputs used by the operator. The hydraulic cylinder 95 is controlled by a dog input/output signal sent by the PLC 17. The log rotation motor 55, saw position drive 75, and log position signals are sent by the PLC 17 on a continuous or interleaved basis depending on the control feedback required by the system. If the operator console 200 manually adjusts these positions and speeds then these signals may be unnecessary. The log transfer signal activates the log feeding mechanism 11. Output signals to various pilot lights allow the operator to monitor the functionality of various parts from a distance. The alarm signals are important to the end-dogging head saw 10. Various PLC alarm modules may be continuously running in the background as they check whether various measurements are in an acceptable range or are surpassing a particular threshold.

The log-turning device 25 is comprised of a drive dog 65, powered by an electric servomotor 55 with built-in brakes 60, which grips the log 20 and rotates it either clockwise or counter-clockwise. A free dog 70 grips the opposite end of the log 20, the two rotating dogs 65 and 70 maintaining the log 20 in a stable position properly aligned for cutting. Means can be employed to allow the log-turning device 25 to "remember" earlier positions of the log 20 for cuts on the same plane.

Paired band saws 30 are employed as the cutting means in this preferred embodiment of the present invention. They are fitted with independent electric motors 45 as well as tensioning means (not shown) such as are common in the art. The band saws 30, having endless blades 31, are also fitted with independent electric servo motor positioning systems 75 and chain drives 76 to control axial displacement as necessary, depending on the diameter of the log 20.

The end-dogging head saw 10 is fitted with two overhead log carriages 35 which hold the log 20 in a generally horizontal position for contact with the band saws 30. The overhead log carriages 35 are driven by a carriage drive 40, which is comprised of a cable 80 linked to a forward/reverse electric or hydraulic variable speed motor 85. A hydraulic cylinder 95 is positioned between the overhead log carriages 35 to force the end dogs 65 and 70 into the ends of the log 20, and the cable 80 is fed through two drums 90 to maintain a controlled, steady speed for movement in both directions.

The operator console 200 allows the operator of the present invention to perform the following method either manually, automatically, or a combination of both, controlling the feed and dogging of log 20, the positioning of band saws 30, and the cutting of the log 20 by movement between the band saws 30. A manual override is available on the operator console 200 for all potentially automatic functions.

Figure 5:
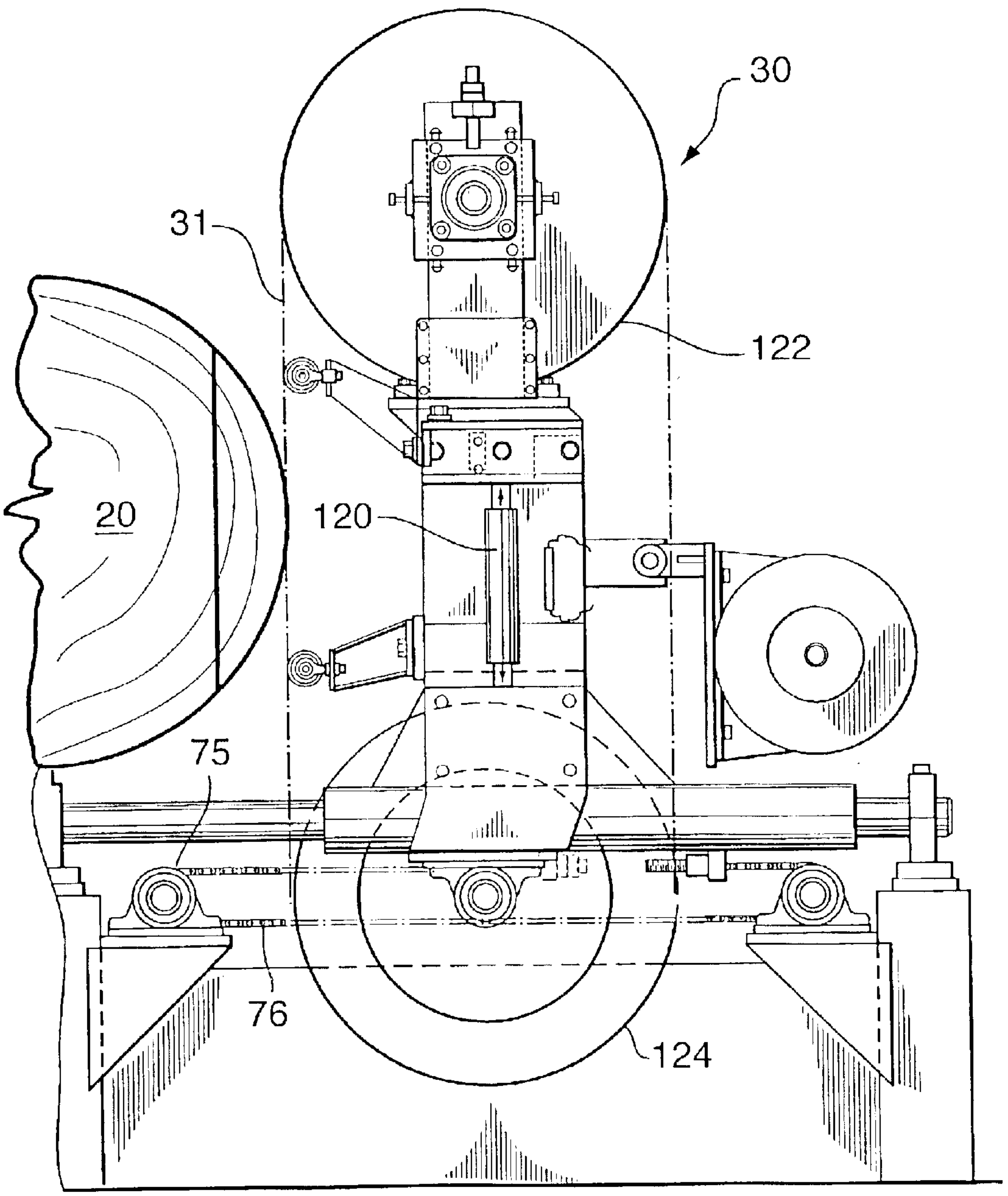
FIG. 5 is an end view of a band saw.

To maintain proper tension in the saw blades 31 and provide more even cuts, a strain gauge 120 (see FIG. 5) is provided to monitor movement of upper and lower band saw wheels 122 and 124 and provide signals to control the speed of the motor 85 and the carriage 35.

Figure 10:
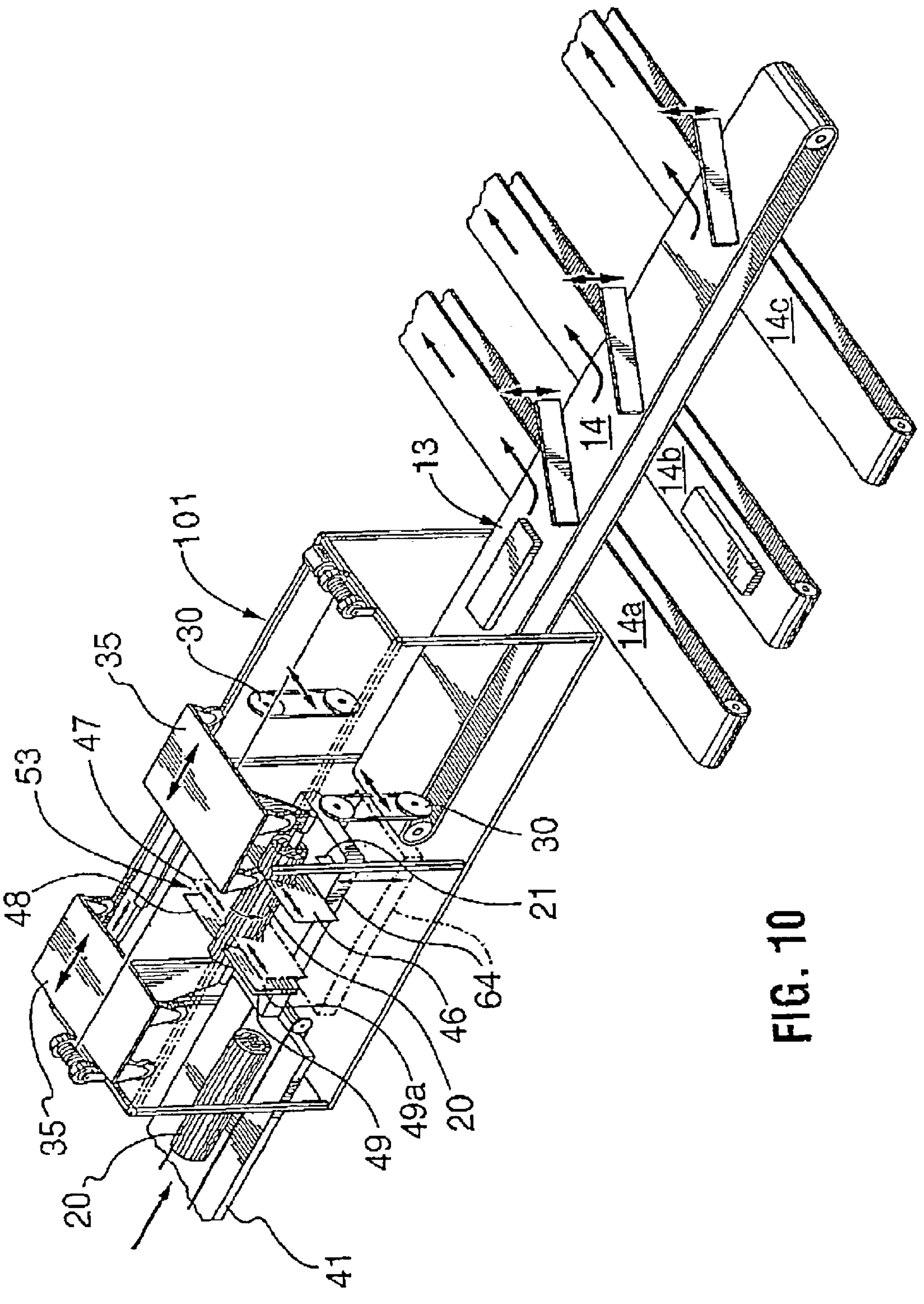
FIG. 10 is a diagrammatic perspective view.
Figure 11:
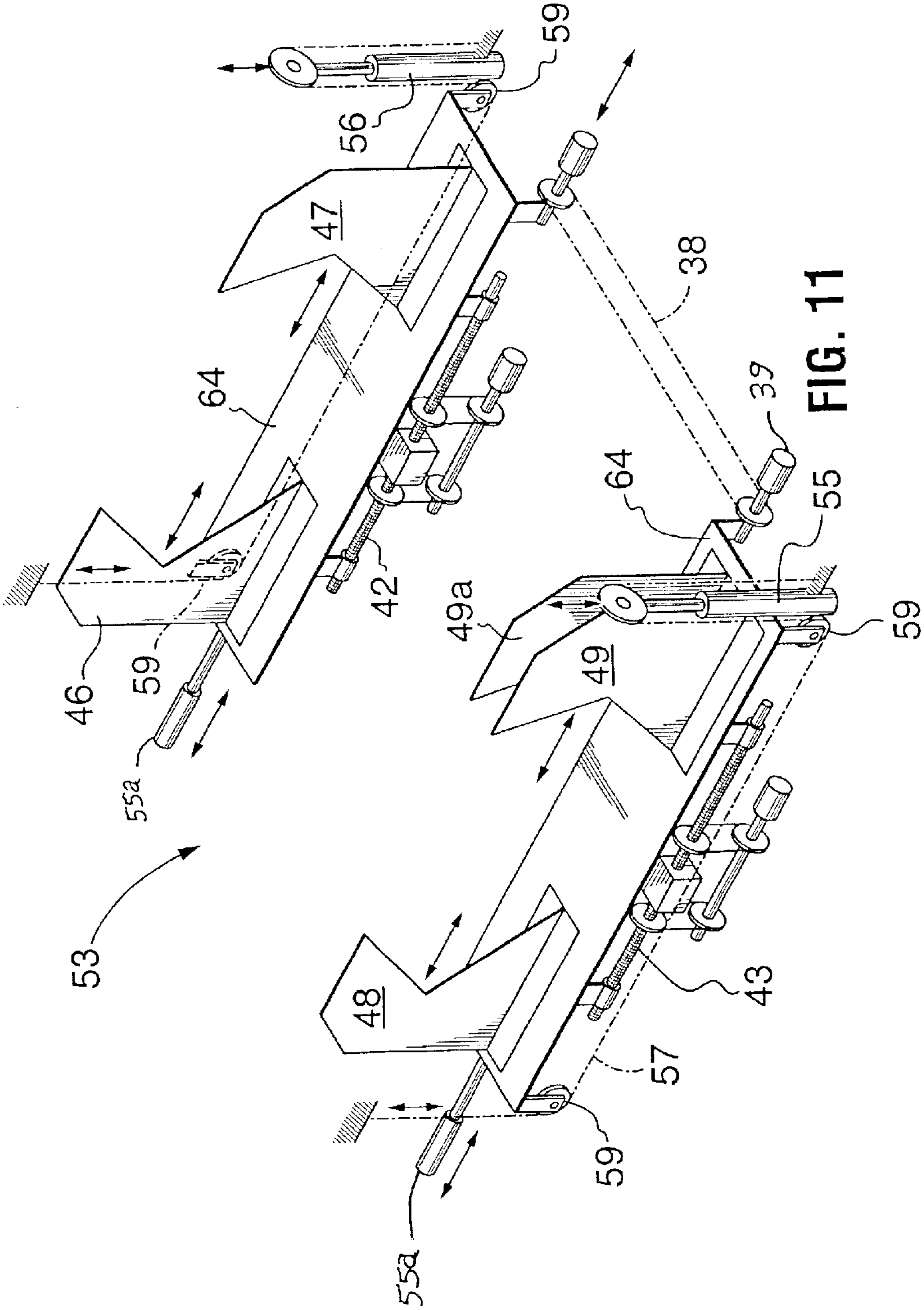
FIG. 11 is a perspective view of a modified cradle.

In FIGS. 10 and 11 a modified end-dogging head saw generally denoted as 101 has a log cradle 64. The band saws 30 overhead log carriages 35 the same as those illustrated in FIG. 1. The end-dogging head saw 101 is fed with logs 20 by means of a log feeding conveyor 41 and the processed lumber 21 passes out of the end-dogging head saw 101 by means of parallel and transverse board removal mechanisms 13 and 14 respectively where board removal mechanism 14 has three transverse board conveyor belts 14*a*, 14*b*, and 14*c*. The log cradle 64 receives an end of the log 20.

A centering device 53 on the log cradle 64 includes a pair of clamping blades 46 and 47 similar to the indentation of the cradle 15 V-shaped indentations in mating a second pair of clamping of blades 48, 49 and 49*a* on the cradle 64 is spaced from the clamping blades 46 and 47 and have identical V-shaped indentations.

Inward and outward movement of the blade 46 and 47 is provided by a worm drive 42 and a worm drive 43 moves the blades 48 and 49 in a similar manner to grip and center the log 20. The log cradle 64 is also used to move the log 20 longitudinally. The blades 46 and 47 have side guides 36, 37 so that the pair of blades can be moved by a chain drive 38 and motor 39 toward the conveyor 41 to grip a log 20 and pull the log into the cradle 64.

If the log 20 is less than about 2 feet in length the log can be held by the blades 46 and 47 without being engaged by the blades 48, 49 and 49*a*. The log cradle 64 is operated automatically or manually and receives the forward end of the log 20 as shown in FIG. 10 as the blades 46 and 47 move toward the blades 48, 49 and 49*a*.

The blades 46 and 47 are positioned on the log 20 and activated to grip the log 20 and pull the log into the cradle 64. The two sets of blades 46, 47 and blades 48, 49, 49*a* are then moved by their worm drives 42 and 43 respectively to center the log 20.

The log is now centered in the horizontal plane and is ready for lifting. A sensor mounted on each centering mechanism is used for measuring the log diameter. The numbers are stored in memory. The cradle 64 moves upward in position for dogging. If the log needs to be centered differently, a +/−6 in. adjustment is possible in every direction. The operator has to switch to manual mode to do so using hydraulic cylinders 55*a* (see FIG. 11). The log length and diameters stored in memory are used to determine the current patterns and to provide the lumber volume.

Figure 12:
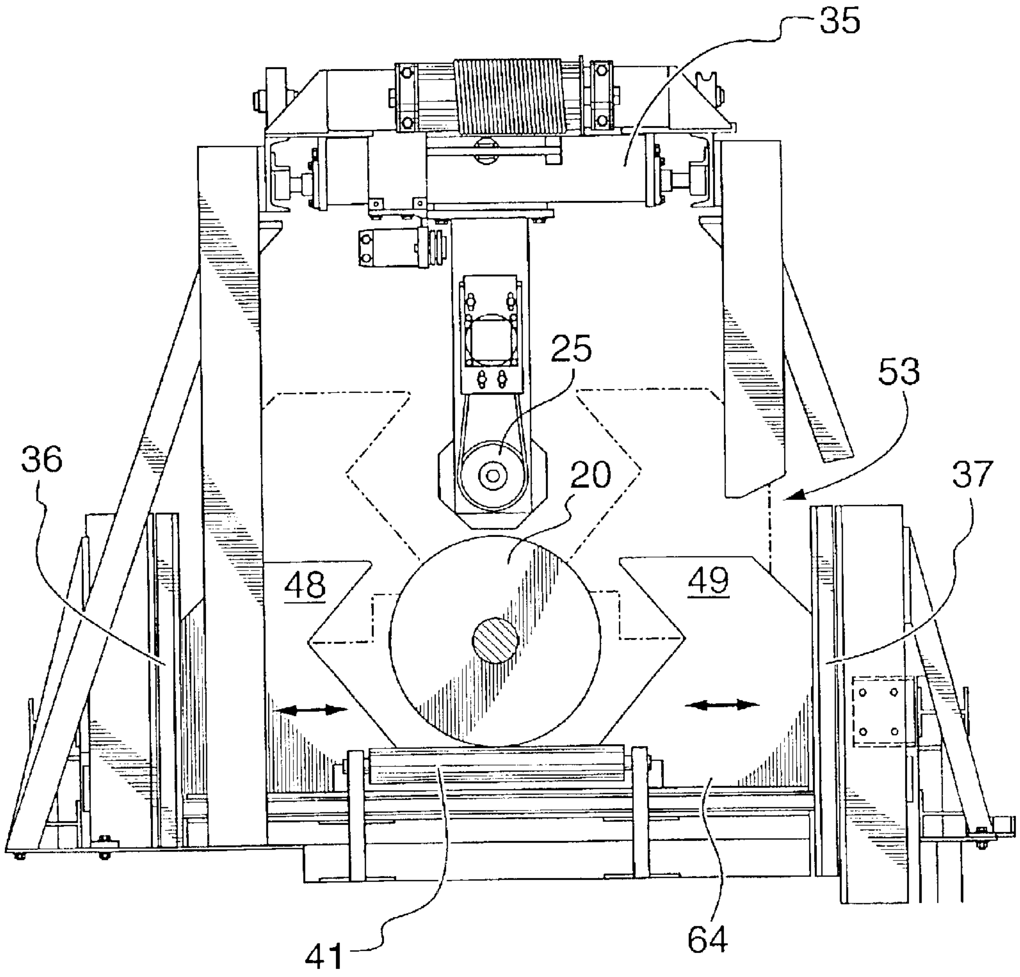
FIG. 12 is an end view of the modified cradle.

The cradle 64 can also be raised and lowered (as shown in FIG. 12) by activating hydraulic cylinder 55 and 56 on the frame 36 of the saw 10 to move cables 57 and 58 respectively on the under side of the cradle 64. The cables 57 and 58 have their outer ends attached to the frame 34. The cables 57 and 58 entrain suitable pulleys 59.

As shown in FIG. 9 the PLC 17 is adapted for use with the log cradle 64 of FIGS. 10, 11 and 12.

The PLC includes controls (shown in broken lines on FIG. 9) for transverse movement of blades 46 and 47, through worm drive 42, transverse movement of blade 48, 49 and 49*a*, by means of worm drive 43, and longitudinal movement of blades 48 and 49 by activating the hydraulic motor 39. Raising and lowering cradle 64 to position a log 20 between dogs 65 and 70 is done by activating hydraulic cylinders 55 and 56.

As shown in FIGS. 10 and 12, loading a second log 20 on the carriage 64 takes place while a log 20 is being sawed.

Referring to all of the Figures, the utility of the present invention becomes clear in the following method of use. The operator of the end-dogging head saw 10 uses the operator console 200 to feed a log 20 by means of log-feeding mechanism 11 (powered by hydraulic cylinder 12), the log 20 resting in the log cradle 15. The log cradle 15 is then adjusted, based on data from the scanning device 21 and PLC processor 19, using the hydraulic cylinders 50 or servo motors 51 to ensure proper alignment of the log 20 relative to the band saws 30. The log-turning device 25 then engages the ends of the log 20, gripping the ends by means of end dogs 65 and 70. The log cradle 15 then moves down to allow progress of the log 20 into the cutting stage. The operator then uses the log-turning device 25, via the drive dog 65, to rotate the log 20 into the desired position, the electric servomotors 55 and brakes 60 affording necessary control. The operator then adjusts the band saws 30 using the positioning systems 75, and the band saws 30 are powered by electric motors 45. The log 20 is carried through the cutting area of the band saws 30 by means of the overhead log carriages 35, which are powered by the carriage drive 40. The band saw blades 31 are preferably of a thickness of 0.035 inches to 0.042 inches and a width of 1¼ inches to 2 inches, set preferably on 19-inch or 20-inch wheels.

After the log 20 is driven through the band saws 30, the overhead log carriages 35 return the log 20 to its original pre-cutting location. During the return, the log 20 can either be (a) rotated by means of the log-turning device 25 into a different desired position or (b) not rotated and the band saws 30 can be adjusted to make a deeper cut.

Figure 4:
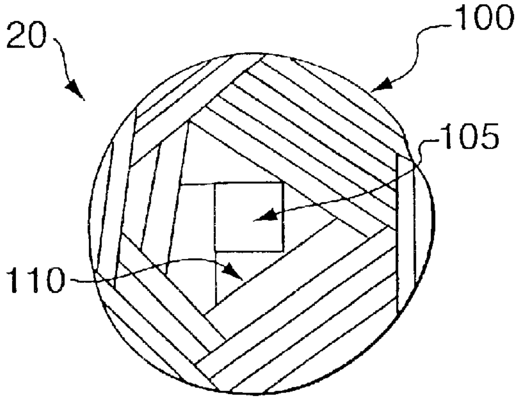
FIG. 4 is a cross-sectional view of a log displaying the positions of the various cuts to be made using the present invention.

As illustrated in FIG. 4, a sawing pattern can be employed to maximize production of high-quality boards 100. By making a plurality of tangential cuts at various angles through rotation of the log 20, a small core will remain. A beam 105 can be cut from this core, either 4 inches×4 inches, 5 inches×5 inches, or 6 inches×6 inches, depending on the core diameter, with the small amount of remainder as waste 110 for wood chips. The beam 105 is automatically produced and is released to the board-removal mechanism 13, as are the boards 100 that are produced during this process, the board-removal mechanism 13 preferably comprising a conveyor belt 14 and transverse conveyor belts 14*a*, 14*b* and 14*c*. The PLC 17 can be programmed to cut boards to custom dimensions to suit customer requirements.

It will be clear to any person skilled in the art that modifications of and adjustments to this invention, not shown, are possible without departing from the spirit of the invention as demonstrated through this preferred embodiment.

What is claimed is:

1. An end-dogging head saw apparatus for processing without discarding logs having different lengths, comprising in combination:

a frame;

a log cradle, operatively coupled to the frame, for supporting a log;

at least one band saw, operatively coupled to the frame, for cutting the log;

overhead log carriages, operatively coupled to the frame, for receiving the log from the log cradle;

a log-turning device, depending from the overhead log carriages constructed and arranged to rotate the log into proper alignment for cutting of the log at an angle with the at least one band saw;

a carriage drive, operatively coupled to the overhead log carriages, for powering the overhead log carriages; and the overhead logs carriages, constructed and arranged to receive the log, each having means for moving independently to respective positions that accommodate the length of the log and for moving the log into contact with the at least one band saw;

whereby logs of different length can be quickly and efficiently processed by the apparatus.

2. An end-dogging head saw apparatus as in claim 1, further comprising automatic means, operatively coupled to the end-dogging head saw, for adjusting the log cradle.

3. An end-dogging bead saw apparatus as in claim 2, wherein the automatic means for adjusting the log cradle comprise hydraulic cylinders.

4. An end-dogging head saw apparatus as in claim 1, further comprising a scanner, operatively coupled to the end-dogging head saw, for detecting the log diameter and a processor for utilizing the data received from the scanner, enabling efficient cutting.

5. An end-dogging head saw apparatus as in claim 1, further comprising an electric servomotor and brakes operatively coupled to the log-turning device.

6. An end-dogging head saw apparatus as in claim 1, wherein the log-turning device further comprises means for returning the log to its original position before contact with the at least one band saw to allow for further cutting.

7. An end-dogging head saw apparatus as in claim 1, wherein the log-turning device further comprises dogs for stabilizing the log position, one dog driven by the log-turning device and the other rotating freely, allowing for stable rotation of the log by the log-turning device.

8. An end-dogging head saw apparatus as in claim 3, further comprising manual override means, operatively coupled to the end-dogging head saw—for automatic functions provided by the automatic means.

9. An end-dogging head saw apparatus as in claim 1, further comprising a further band saw and means for movement of the at least one band saw toward and apart from the further band saw, wherein movement means are operatively coupled to the end-dogging head saw.

10. An end-dogging head saw apparatus as in claim 9, further comprising independent electric servo positioning systems, operatively coupled to the end-dogging head saw, to maintain an axial displacement of the at least one saw.

11. An end-dogging head saw apparatus as in claim 10, where the pair of band saws includes two wheels to house a cutting blade, further including a strain gauge situated between the two wheels of the at least one band saw for controlling speed of the overhead log carriages.

12. An end-dogging head saw apparatus as in claim 1, wherein the carriage drive includes a cable operatively coupled to the carriage drive, and an electric or hydraulic variable speed motor, operatively linked to the cable.

13. An end-dogging head saw apparatus as in claim 12, further including cable drums, operatively coupled to the cable, to maintain accurate and steady speed of cable movement.

14. An end-dogging head saw apparatus as in claim 1, further comprising a hydraulic cylinder operatively coupled between the overhead log carriages to force the dogs into the log.

15. An end-dogging head saw apparatus as in claim 1, wherein the at least one band saw is powered by independent electric motors operatively coupled thereto.

16. A pre-positioning device for use with a head saw apparatus with end-dogging means to grip the log from the pre-positioning device, comprising:

a cradle for moving a log into position for dogging by the head saw apparatus;

a set of clamping blades for gripping the log, where the set includes a pair of blades disposed substantially in parallel and an opposing third blade, the pair of blades and the third being operatively mounted at opposing ends of the cradle, and where each of the pair of blades and the third blade being constructed and arranged to engage the log at a first position and a second position along the log so as to securely grip the log for movement toward the head saw apparatus;

drive means, being operatively coupled to the set of clamping blades and mounted onto the cradle, for moving the set of clamping blades inwardly and outwardly to engage the log; and at least one sensor, operatively coupled to the cradle, for sensing at least one physical characteristic of the log, the at least one sensor having means for processing at least one physical characteristic measured by scanning the log to enable proper positioning of the log prior to dogging by the head saw apparatus.

17. The pre-positioning device of claim 16, further includes a second cradle and at least one set of clamping blades, operatively mounted onto the second cradle, for engaging the log at a third position along the log so as to securely grip the log for movement toward the head saw apparatus.

18. The pre-positioning device of claim 16, wherein the first positions and the second position are approximately equidistant from either end of the log.

19. The pre-positioning device of claim 16, wherein the moving means is at least one hydraulic cylinder operatively coupled to the carriage for raising and lowering the cradle, the at least one hydraulic cylinder is activated by the at least one sensor.

20. The pre-positioning device of claim 16, wherein the drive means is a worm drive system operatively coupled to the at least one set of blades for raising and lowering the cradle, the worm drive system is activated by the at least one sensor.

21. The pre-positioning device of claim 16, wherein the each blade has a V-shaped indentation.

22. The pre-positioning device of claim 17, wherein the each blade has a V-shaped indentation.

23. An end-dogging head saw apparatus for processing without discarding logs having lengths, comprising in combination:

frame;

a log cradle, operatively coupled to the frame, for supporting a log;

at least one band saw, operatively coupled to the frame, for cutting the log;

overhead log carriages, operatively coupled to the frame, for receiving the log from the log cradle;

a log-turning device, depending from the overhead log carriages, constructed and arranged to rotate the log into proper alignment for cutting of the log at an angle with the pair of band saws, and having means for returning the log to its original position before contact with the at least one band saw to allow for further cutting; and a carriage drive, operatively coupled to the overhead log carriages, for powering the overhead log carriages;

the overhead log carriages, constructed and arranged to receive the log, each having means for moving independently to respective positions that accommodate the length of the log and for moving the log into contact with the at least one band saw;

whereby logs of different length can be quickly and efficiently processed by the apparatus.

24. An end-dogging head saw apparatus as in claim 1, wherein the pair of band saws are constructed and arranged to tangentially cut the log at a plurality of angles through rotation of the log by the log-turning device, and the plurality of angles selected to form a sawing pattern.

25. An end-dogging head saw apparatus as in claim 23, wherein the pair of band saws are constructed and arranged to tangentially cut the log at a plurality of angles through rotation of the log by the log-turning device, and the plurality of angles selected to form a sawing pattern.

* * * * *